United States Patent

Neumaier

[11] 3,947,180
[45] Mar. 30, 1976

[54] APPARATUS FOR COMBINED INJECTION MOULDING AND BLOW FORMING OF CONTAINERS OR OBJECTS FORM PLASTICS MATERIAL

[75] Inventor: Robert Neumaier, Glottertal am Ohrensbachle, Germany

[73] Assignee: Van Leer Verpackungen GmbH, Germany

[22] Filed: Aug. 15, 1973

[21] Appl. No.: 388,453

[30] Foreign Application Priority Data
Aug. 17, 1972 Germany............................ 2240374

[52] U.S. Cl. 425/242 B; 425/DIG. 209; 425/DIG. 211; 425/DIG. 213
[51] Int. Cl.² ......................................... B29D 23/03
[58] Field of Search 425/242 B, DIG. 203, DIG. 209, 425/DIG. 213, DIG. 208, DIG. 211, 246, 261, 324 B, 451, 453

[56] References Cited
UNITED STATES PATENTS

| | | | |
|---|---|---|---|
| 3,173,176 | 3/1965 | Kobayasi.................. | 425/246 X |
| 3,479,690 | 11/1969 | Hagen...................... | 425/DIG. 211 |
| 3,559,245 | 2/1971 | Ryan....................... | 425/DIG. 209 |
| 3,579,725 | 5/1971 | Hansen et al............. | 425/DIG. 209 |
| 3,781,395 | 12/1973 | Uhlig...................... | 425/DIG. 215 |

Primary Examiner—J. Howard Flint, Jr.
Assistant Examiner—Carl Rowold
Attorney, Agent, or Firm—Jordan B. Bierman; Linda G. Bierman; Kenneth J. Stempler

[57] ABSTRACT

A method and apparatus for combined injection moulding and blow forming of containers or objects of plastics material. A preform is formed on a mandrel by injection moulding. The mandrel with the preform is transferred from the injection mould to a blow forming mould and the preform is blow formed to the final product. It is characteristic of the invention that the preforms are formed in the injection mould and extracted from the injection mould at a higher rate than their forming in the blow forming mould, two or more preforms being simultaneously blow formed in two or more blow forming moulds. This arrangement has the advantage of providing complete independence of the two production cycles. The apparatus includes a conveyor for the mandrels carrying the preforms, this conveyor extending from an injection mould to a blow forming mould. The conveyor comprises a rail and carriages carried and guided by the rails, which carriages are movable independently of each other and of the rate of operation of the injection mould and blow forming mould. Two or more blow forming moulds are arranged along said conveyor.

4 Claims, 2 Drawing Figures

APPARATUS FOR COMBINED INJECTION MOULDING AND BLOW FORMING OF CONTAINERS OR OBJECTS FORM PLASTICS MATERIAL

The forming of plastics products by combined injection moulding and blow forming has been known for many years. The patent literature concentrates on methods for transferring the preform from the injection mould to the blow forming mould. This is a step of considerable economical and technological importance. With the methods known so far the forming of the preform in the injection mould and the final blowing of the product are carried out simultaneously and at the same rates in synchronized cycles.

This means that the injection moulding of a single preform and the final blow forming must have the same duration. However, it has been found that whereas the blow forming requires about ten to 15 seconds the time required for the injection moulding can be reduced to about 2 seconds. It is therefore necessary to look for methods for a more economic way of using such injection moulding and blow forming machines.

The invention has the object of providing complete independence of the two production cycles. According to the invention the mandrels carrying the preform are movable along a conveyor completely independent of each other and of the production rates of the injection mould and blow of the forming station. Therefore the conveyor extends through all production stations. The conveyor preferably comprises a rail where carriages are carried and guided, which carriages are movable independently of each other either by hand or by a corresponding drive means.

Figure 1:
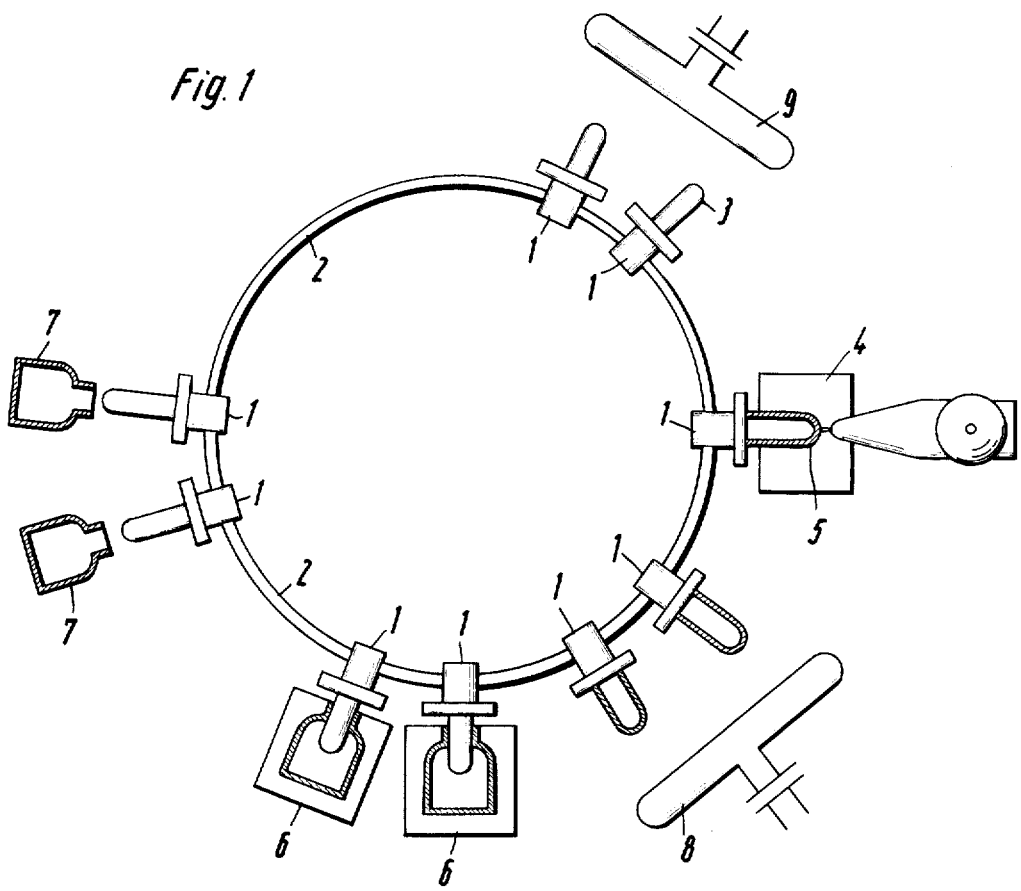
FIG. 1 shows a schematic plan view of a complete production site for combined injection moulding and blow forming.

FIG. 1 shows carriages 1 movably mounted and guided on a rail or carrier 2. The rail 2 forms a closed path for the carriages 1. This path may have the geometrical form a circle as shown in the figure or any other form. The carriages 1 carry the mandrels 3, on which the preform 5 is formed in an injection mould 4 in a conventional manner. The injection mould 4 may be provided with the usual conventional plastifying and extrusion machine as schematically indicated in FIG. 1. When the preform 5 has been formed the extrusion mould 4 is opened and the carriage 1 with mandrel 3 carrying the preform 4 are further advanced along the rail 2. They pass through a heating section where the preforms are suitably heated by heating means indicated at 8 which may comprise conventional electrical induction heaters. The carriages 1 with the preheated preforms then are advanced to blow moulding forms 6 where the preforms are shaped to the final product by pressurized air which is blown through the mandrel into the interior of the preform in a conventional manner. The blow forming moulds 6 operate at a lower rate than the injection mould 4. Thus two (or more) preforms are simultaneously blow moulded in two (or more) blow forming moulds 6 arranged along the rail 2. The cycle necessary for blow forming is sufficiently long for the injection mould 4 to complete two (or more) operational cycles thereby producing two (or more) preforms 5, which, as the carriages 1 are independently movable, may be extracted from the injection mould 4 and kept waiting opposite the heating means 8 until they are admitted to the blow forming moulds 6.

The final products 7 obtained by blow forming are taken off or extracted from the mandrels at a subsequent take-off station. The carriages 1 carrying the empty mandrels are then advanced along the rail 2 through a further heating section where they are preheated by heating means 9 (preferably electrical induction heating) before they are moved again into injection mould 4.

Figure 2:
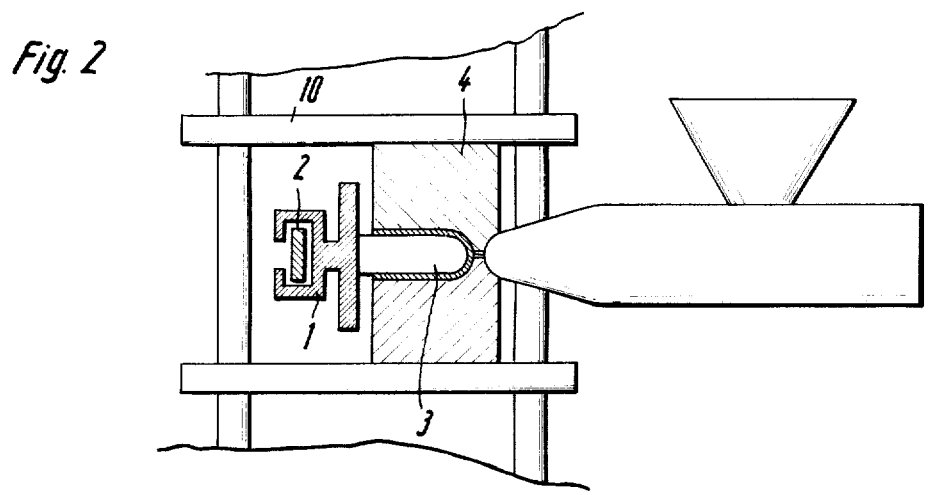
FIG. 2 shows a schematic vertical section through the injection mould.

As shown in FIG. 2 the rail 2 may have a simple rectangular cross section and the carriages 1 may be attached by simple C-shaped guiding profiles. Of course roller bearings or similar means may be provided. The means by which pressurized air is introduced through the mandrels at each of blow forms 6 are not shown as they are easy to conceive for those skilled in the art such as disclosed in U.S. Pat. No. 3,579,725 to Hansen, et al.

What is claimed is:

1. An apparatus for the combined injection moulding and blow moulding of objects from plastic material comprising: a plurality of mandrels; conveyance means, said mandrels being mounted on said conveyance means, each of said mandrels being moveable on said conveyance means independently of the other mandrels; at least one injection moulding means for moulding a plastic preform on said mandrel, and at least one more blow moulding means for blow moulding said preform than injection molding means, said conveyance means extending from said injection moulding means to said blow moulding means.

2. The apparatus according to claim 1 further comprising a take-off station, said conveyance means further extending from said blow moulding means to said take-off station.

3. The apparatus according to claim 2 wherein said conveyance means extends from said take-off station to said injection moulding means, the conveyance means comprising a closed loop.

4. The apparatus according to claim 1 wherein said conveyance means comprises a rail; carriage means mounted on said rail for carrying said mandrels, said carriage means being independently moveable with respect to each other on said rail.

* * * * *